(12) United States Patent
Büker

(10) Patent No.: US 11,801,886 B2
(45) Date of Patent: Oct. 31, 2023

(54) STEERING DEVICE COMPRISING AN END STOP DEVICE AND STEER-BY-WIRE STEERING SYSTEM COMPRISING SUCH A STEERING DEVICE

(71) Applicant: ZF Automotive Germany GmbH, Alfdorf (DE)

(72) Inventor: Richard Büker, Willich (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/841,301

(22) Filed: Jun. 15, 2022

(65) Prior Publication Data

US 2022/0396304 A1 Dec. 15, 2022

(30) Foreign Application Priority Data

Jun. 15, 2021 (DE) .......................... 102021206069.2

(51) Int. Cl.
*B62D 5/00* (2006.01)
*B62D 1/10* (2006.01)

(52) U.S. Cl.
CPC .............. *B62D 5/001* (2013.01); *B62D 1/10* (2013.01)

(58) Field of Classification Search
CPC ......... B62D 5/001; B62D 5/0469; B62D 1/10
See application file for complete search history.

(56) References Cited

U.S. PATENT DOCUMENTS

| 11,485,403 | B2* | 11/2022 | Walentowski | ........... B62D 1/16 |
| 2018/0362079 | A1* | 12/2018 | Zuzelski | .................. B62D 5/04 |
| 2020/0130725 | A1* | 4/2020 | Ishimura | .................. B62D 1/04 |
| 2021/0070361 | A1* | 3/2021 | Erickson | .................. H02P 6/08 |
| 2022/0266895 | A1* | 8/2022 | Ku | ........................ B62D 5/0421 |

FOREIGN PATENT DOCUMENTS

| CN | 218229120 U | * | 1/2023 | |
| DE | 102013014138 B3 | | 12/2014 | |
| DE | 102018103963 A1 | * | 8/2018 | ............. B62D 5/001 |
| DE | 102018103963 A1 | | 8/2018 | |
| DE | 202019105966 U1 | | 1/2021 | |
| JP | 2016156440 A | * | 9/2016 | ............. F16D 15/00 |

* cited by examiner

*Primary Examiner* — Paul N Dickson
*Assistant Examiner* — Matthew D Lee
(74) *Attorney, Agent, or Firm* — Kristin L. Murphy

(57) ABSTRACT

The disclosure relates to a steering device comprising an end stop device for limiting a steering angle of rotation. The end stop device has a rotation device that has at least one rotary element which is rotatable about a central longitudinal axis of a shaft and/or is rotatable together with the shaft. The end stop device has a locking device which cooperates with the rotation device for stopping a rotational movement of the shaft about the central longitudinal axis and with respect to two directions of rotation oriented opposite each other. In order to be able to reliably absorb and transmit high forces and/or torques when the steering device is in a stop position, the locking device has a locking element, the locking element that limits the steering angle of rotation from being movable by the rotation device at least with a first movement component in the axial direction of the central longitudinal axis of the shaft.

20 Claims, 13 Drawing Sheets

STEERING DEVICE COMPRISING AN END STOP DEVICE AND STEER-BY-WIRE STEERING SYSTEM COMPRISING SUCH A STEERING DEVICE

CROSS-REFERENCE TO RELATED APPLICATION

This application claims priority to German Priority Application No. 102021206069.2, filed Jun. 15, 2021, the disclosure of which is incorporated herein by reference in its entirety.

TECHNICAL FIELD

The disclosure relates to a steering device comprising an end stop device for limiting a steering angle of rotation, the end stop device having a rotation device, and the rotation device having at least one rotary element which is rotatable about a central longitudinal axis of a shaft and/or is rotatable together with the shaft, and the end stop device having a locking device which cooperates with the rotation device for stopping a rotational movement of the shaft about the central longitudinal axis and with respect to two directions of rotation that are oriented away from each other. Furthermore, the disclosure relates to a steer-by-wire steering system having such a steering device.

BACKGROUND

Such a steering device is known from DE 10 2018 218 484 A1.

In a steer-by-wire steering system there is no mechanical connection be tween a steering wheel and a steering gear. A control unit therefore transmits steering commands to an electric motor, which uses the steering gear to move a rack to steer the wheels. Here, the steering rack can set a steering angle at the wheels by tie rods. The steering device has a feedback motor which simulates steering forces in order to give the driver feedback from the steering forces that are acting.

In a conventional steering system with a mechanical connection between the steering wheel and the rack, the steering angle of a steering wheel is limited due to the specified mechanics. On the other hand, due to the lack of mechanical connection between the steering device and the steering gear in a steer-by-wire steering system, it would be possible to turn the steering wheel infinitely in one direction of rotation. However, there is a risk of overloading or damaging components of the steering device. In addition, the driver needs feedback on the maximum achievable steering angle at the wheels.

Therefore, the steering device mentioned at the outset includes an end stop device for limiting the steering angle of rotation. However, high forces and/or torques can be in effect at a stop position. Due to a restricted installation space, however, it is not possible to configure stop elements or stop surfaces of any size. Therefore, there is often a risk of overloading and thus damaging the steering de vice. In addition, high-quality and therefore expensive materials often have to be used to realize a stop solution.

SUMMARY

What is needed is to further develop a steering device and/or a steer-by-wire steering system of the type mentioned at the outset in such a way that high forces and/or torques can be reliably absorbed and transmitted when the steering device is in a stop position. In particular, an alternative arrangement is to be provided herein.

The disclosure thus relates to a steering device. The steering device can have a steering wheel. Here, the term steering wheel is a synonym for a steering handle of any shape and/or design. The steering device has an end stop device. A steering angle of rotation of the steering device is limited by the end stop device. The steering device has a shaft, the shaft being rotatable or rotatably mounted about its central longitudinal axis. Here, the shaft can be rotated about the central longitudinal axis in two directions of rotation that are oriented away from each other. By operation of the end stop device, the steering angle and thus the rotation of the shaft about its central longitudinal axis is limited in both directions of rotation.

The steering device may also include a feedback motor. Here, the shaft can be displaced by the feedback motor in the rotational movement about the central longitudinal axis of the shaft, for example with the interposition of a gear unit, and/or can provide a controllable torque resistance. In this way, feedback from the steering forces acting on the wheels can be given to the driver of a vehicle or motor vehicle having such a steering device. In one exemplary arrangement, the feedback motor is configured as an electric motor.

The end stop device has a rotation device. Here, the rotation device has at least one rotary element. The rotary element is rotatable about the central longitudinal axis of the shaft and/or together with the shaft. Furthermore, the end stop device has a locking device. The locking device cooperates with the rotation device to stop the rotational movement of the shaft about the central longitudinal axis and with respect to the two directions of rotations that are oriented away from each other. The locking device has a locking element. Here, the locking element for limiting the steering angle of rotation by operation of the rotation device is movable at least with a first movement component in the axial direction of the central longitudinal axis of the shaft.

The advantage here is that, due to the cooperation of the locking element and the rotation device, a change in the direction of movement from the direction of rotation about the central longitudinal axis at least partially results in at least a first movement component in the axial direction of the central longitudinal axis of the shaft, which allows new or additional design possibilities. In particular, this results in the possibility of enlarging, as compared to the prior art, a total stop surface for realizing a stop position of the locking element and for stopping the rotational movement. As a result, greater forces and/or torques can be absorbed and/or transmitted in the stop position. In particular, alternative arrangements are possible.

According to a further exemplary development, the locking element for limiting the steering angle of rotation by operation of the rotation device is movable with a further movement component in a direction of rotation about the central longitudinal axis of the shaft. In particular, the locking element with the further movement component is movable together with the shaft in a direction of rotation about the central longitudinal axis of the shaft. Thus, the locking element can simultaneously be moved both in the axial direction of the central longitudinal axis of the shaft and in a direction of rotation about the central longitudinal axis of the shaft. In other words, the locking element can simultaneously perform a translational movement in the axial direction of the central longitudinal axis and a rotational movement about the central longitudinal axis. This movement of the locking element is triggered by operation of the rotation device.

In one exemplary arrangement, the first movement component in the axial direction of the central longitudinal axis is directed in the direction of the rotation device and/or onto the rotation device. The locking element abuts against at least one stop element to stop the rotational movement of the shaft and in a direction of rotation. The stop element of a further rotational movement thus acts counter to the direction of rotation directed toward the stop element. The locking element can be re leased again from the at least one stop element with a rotational movement directed in a direction of rotation directed away from the stop element. In one exemplary arrangement, the stop element is configured as a projection of a housing oriented radially with respect to the central longitudinal axis of the shaft.

The stop element can be configured as a web-like or rib-like projection on an inside of the housing. In one exemplary arrangement, the housing has a hollow-cylindrical inner peripheral surface on which the stop element is formed. In one exemplary arrangement, the locking device has a plurality of stop elements. The plurality of stop elements can be arranged and/or formed on the inner peripheral surface of the housing equidistant from one another. Provision of a plurality of stop elements makes it possible for the total stop surface for the abutment of the locking element to be or become expanded. In one exemplary arrangement, the stop element is arranged in a rotationally fixed manner and/or in a position that is fixed in relation to the locking element.

According to a further exemplary arrangement, an engagement contour of the locking element engages, based on the first movement component in the axial direction of the central longitudinal axis, positively locking into a correspondingly configured receiving contour. For example, the engagement contour of the locking element engages in a positive-locking manner in the receiving contour when the locking element is in a stop position. The receiving contour can be associated with the rotation device or a gear wheel. Due to the meshing of the engagement contour and the receiving contour, higher forces and/or torques can be transmitted and/or absorbed in the stop position of the locking element for stopping the rotational movement. In one exemplary arrangement, the total stop surface can be or become enlarged due to the positive lock between the engagement contour and the receiving contour.

In one exemplary arrangement, the receiving contour is formed on an annular body. The annular body is arranged on the shaft and/or around the shaft in a rotationally fixed manner and/or in a fixed position. When the shaft rotates about its central longitudinal axis, the annular body rotates with it. The annular body can be configured as a gear wheel. The gear wheel can be connected to the feedback motor, for example with the interposition of a gear unit. The engagement contour and/or the receiving contour can be annular. If the annular body is configured as a gear wheel, the receiving contour can be configured as an annular structure in the gear wheel.

The locking element can be configured like a sleeve. Furthermore, the locking element can have a first claw coupling portion for forming the engagement contour. This first claw coupling portion can face a second claw coupling portion to create a claw coupling. Here, the second caw coupling portion is configured to correspond to the first claw coupling portion. Furthermore, the second claw coupling portion is associated with the annular body. In particular, the two claw coupling portions engage in one another in a positive-locking manner in order to create the claw coupling in the stop position of the locking element. High forces and/or torques can be transmitted in the stop position by a claw coupling realized in this way between the rotation device and the locking device.

According to a further exemplary arrangement, the locking device has a restoring element acting at least in the axial direction of the central longitudinal axis and/or a restoring element providing a guide slot. The restoring element can be configured as a spring, for example as a compression spring, spiral spring, leaf spring or wave spring. This allows the restoring element of a movement of the locking element for limiting the steering angle of rotation to act counter to the axial direction of the central longitudinal axis of the shaft. In one exemplary arrangement, the restoring element of the first movement component of the locking element acts counter to the axial direction of the central longitudinal axis.

In one exemplary arrangement, the locking element can be returned by the restoring element from the stop position and, when the direction of rotation is reversed, into a non-locking starting position. It can thus be ensured by the operation of the restoring element that the locking element can reliably be returned from the stop position of the locking element into its non-locking starting position after a change in the direction of rotation. The restoring element can provide or have a guide slot for the locking element. It can thus be ensured by operation of the return element that the locking element is guided when the locking element is moved or displaced. The restoring element can be supported against the housing or against a securing element. In one exemplary arrangement, a side of the restoring element facing away from the locking element is supported against the securing element or a projection of the housing.

According to a further exemplary arrangement, the locking device has a guide for guiding the locking element. In this case, the guide is arranged in a rotationally fixed manner and/or in a fixed position. The guide can be arranged inside the housing. In particular, the guide is fixed within the housing and on the housing, for example on an inner peripheral surface of the housing. The guide can be configured as an independent guide element. The guide element can be fixed in such a way on the housing that rotation of the guide element about the central longitudinal axis is prevented. Alternatively, the guide can be configured as a guide portion. In one exemplary arrangement, the guide portion is configured as an integral part of the housing. The guide or the guide element can cooperate with the guide slot of the restoring element to guide the locking element.

In one exemplary arrangement, the guide has at least one ramp portion which has a slope extending in one of the two directions of rotation. For example, the guide has a plurality of ramp portions. The guide may include a first group of ramp portions and a second group of ramp portions. The ramp portions of the first group each have a first slope extending in a first direction of rotation. The ramp portions of the second group each have a slope extending in a second direction of rotation. Due to the at least one ramp portion or due to a plurality of ramp portions, the locking element is also movable in an axial direction with respect to the central longitudinal axis, especially in the direction of the first movement component, and in the direction of rotation about the central longitudinal axis. The at least one ramp portion allows a rotational movement of the locking element to be at least partially converted into the first movement component in the axial direction of the central longitudinal axis.

According to a further exemplary arrangement, the rotation device has a driver element. The driver element is mounted so as to be rotatable about the central longitudinal axis of the shaft. A rotational movement of the at least one rotary element can be transmitted to the locking element by operation of the driver element. The rotation device, the at least one rotary element and/or the driver element can be arranged on the shaft or surrounding the shaft.

In one exemplary arrangement, the rotary element has a driving lug which, after a predetermined rotational movement of the rotary element about the central longitudinal axis, abuts the driver element and entrains it in the direction of rotation. For example, the rotation device has a plurality of rotary elements for specifying a maximum steering angle of rotation. The at least one rotary element can have an annular or disk-like design. The at least one rotary element or a first rotary element cooperates with the annular body fixed in a fixed position on the shaft. Thus, when the shaft rotates, the annular body can bump against the at least one rotary element or the first rotary element and entrain it. If there is a plurality of rotary elements, they can bump against each other and be entrained in succession during a continuous rotational movement in the same direction of rotation. A maximum steering angle can be predetermined or set in both directions of rotation via the number of rotation elements. The at least one rotary element or a last rotary element ultimately abuts the driver element during a continuous rotational movement in the same direction of rotation and entrains it in the same direction of rotation. For example, the locking element is entrained together with the driver element. As a result, the locking element is ultimately transferred to the stop position.

In one exemplary arrangement, the locking element has a locking and guiding portion. The locking and guiding portion can have at least one elevation projecting radially outwardly and/or axially with respect to central longitudinal axis. This elevation can have at least one ramp surface for cooperation with the at least one ramp portion of the guide. The gradients of the ramp surface and the ramp portion can be configured to correspond to one another.

In one exemplary arrangement, the elevation has at least one stop surface for abutting a stop element in a stop position of the locking element. The stop surface can extend in the longitudinal direction and/or parallel to the central longitudinal axis. The stop element can have two stop surfaces arranged or aligned facing away from each other. In this case, one of the two stop surfaces is used to stop the rotational movement in one of the two directions of rotation. In one exemplary arrangement, the locking and guiding portion has a plurality of elevations distributed uniformly around the locking element in the circumferential direction. For example, the locking element can have four elevations.

In one exemplary arrangement, the elevation has two ramp surfaces which are mirror-symmetrical to one another. A ramp portion of the guide is associated with each ramp surface. For example, a first ramp surface of the elevation is associated with a ramp portion of a first group of ramp portions of the guide. A second ramp surface of the elevation may be associated with a ramp portion of a second group of ramp portions of the guide. Furthermore, the elevation can have a contact surface on which the restoring element rests and/or is supported. The contact surface can extend transversely or perpendicularly to the central longitudinal axis. In one exemplary arrangement, the contact surface faces away from the guide for guiding the locking element.

A steer-by-wire steering system having a steering device according to the disclosure is of particular advantage. In one exemplary arrangement, the steer-by-wire steering system is further developed in accordance with the designs explained in connection with the inventive steering device described here.

BRIEF DESCRIPTION OF DRAWINGS

The disclosure is explained in more detail below with reference to the drawings. In this case, the same reference signs relate to the same, similar, or functionally identical components or elements. In the drawings.

DETAILED DESCRIPTION

Figure 1:
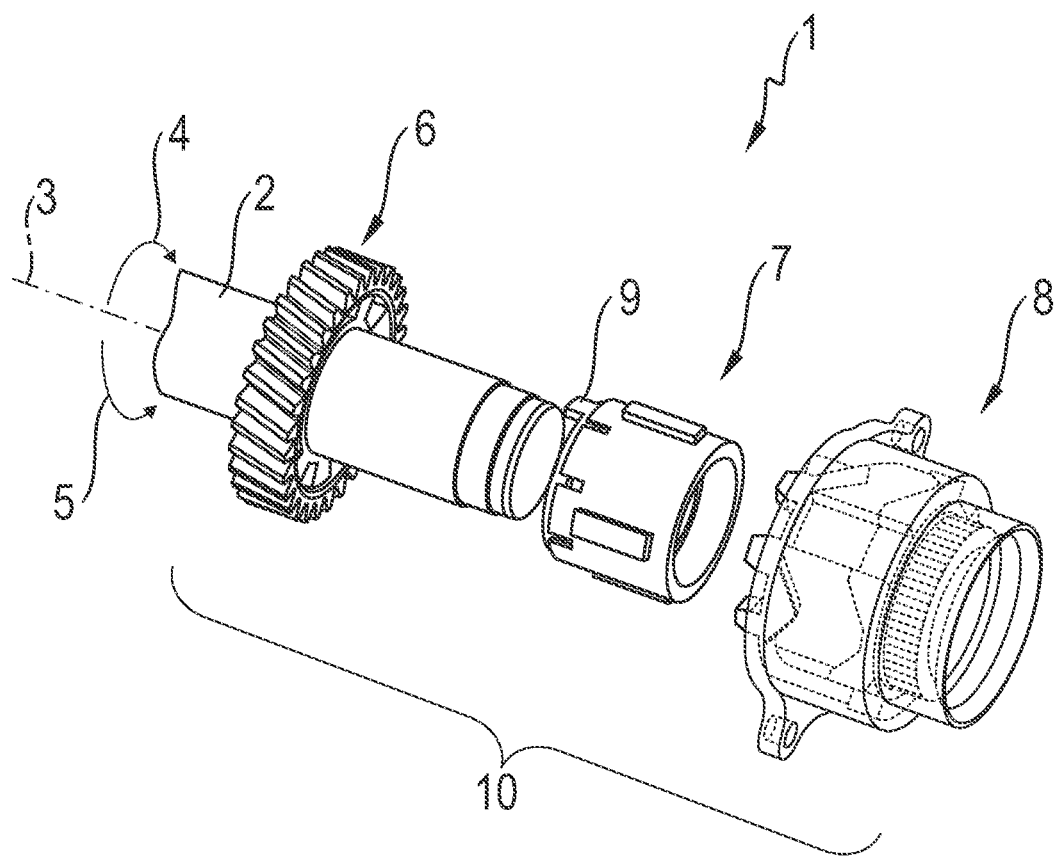
FIG. 1 is a perspective, partially transparent view of a first steering device according to the disclosure in a partially assembled state.

FIG. 1 shows a perspective, partially transparent view of a first steering device 1 according to the disclosure in a partially assembled state. The steering device 1 is part of a steer-by-wire steering system (not shown in detail here). Here, the steering device 1 is provided or configured for a motor vehicle by way of example. The steering device 1 has a shaft 2. Shaft 2 is rotatable or rotatably mounted about its central longitudinal axis 3. In this exemplary arrangement, the shaft 2 is connected to a steering wheel (not shown in detail here). The shaft 2 is rotatable about the central longitudinal axis in two directions of rotation 3 oriented away from each other, in particular by operation of the steering wheel. The two directions of rotation are indicated by the arrows 4, 5.

An annular body 6 is arranged on the shaft 2. The annular body 6 is arranged or attached to the shaft 2 in a rotationally fixed and positionally fixed manner. Correspondingly, the annular body 6 surrounds the shaft 2. Here, a central longitudinal axis of the annular body 6 coincides with the central longitudinal axis 3 of shaft 2. In this exemplary arrangement, the annular body 6 is configured as a gear wheel. The annular body 6 is connected to a feedback motor 5 (not shown in detail here).

Furthermore, the steering device 1 has a rotation device 7 and a locking device 8. The rotation device 7 and the locking device 8 are shown here in a non-assembled state in relation to the shaft 2. For assembly, the rotation device 7 can first be pushed over the shaft 2. The locking device 8 is then arranged on the shaft 2. For this purpose, the locking device 8 is pushed over the rotation device 7. The rotation device 7 and the locking device 8 surround the shaft 2 in the assembled state, but are not connected to the shaft 2 in a rotationally fixed manner. The locking device 8, the rotation device 7 and the annular body 6 form an end stop device 10 for stopping a rotational movement of the shaft 2 about the central longitudinal axis 3 and with respect to the two directions of rotation oriented away from each other according to arrows 4, 5.

Figure 2:
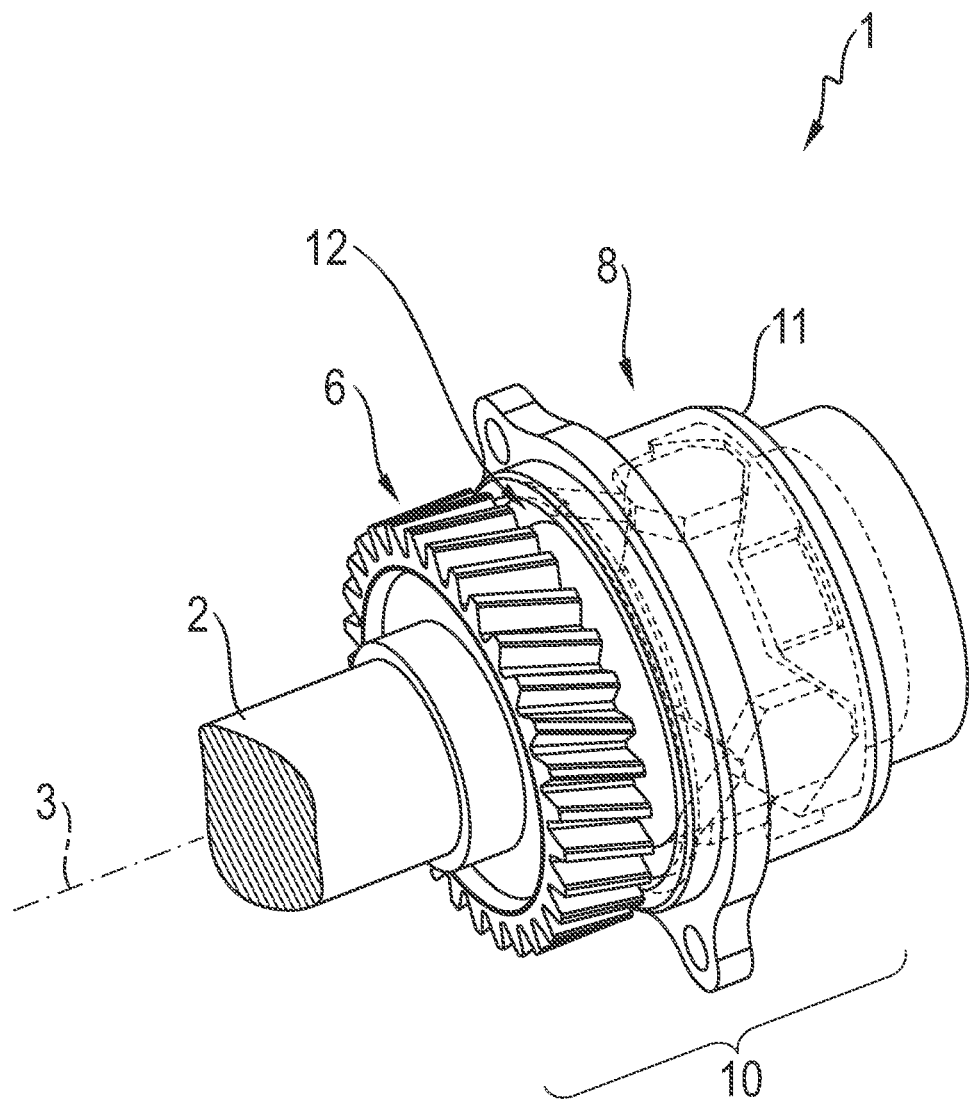
FIG. 2 is a perspective, partially transparent view of the first steering device according to the disclosure according to FIG. 1 in an assembled state.

FIG. 2 shows a perspective, partially transparent view of the first steering device 1 according to the disclosure as shown in FIG. 1 in an assembled state. The locking device 8 has a housing 11, which is shown partially transparently here. As in FIG. 1 shown above, this makes it possible to recognize further components of the locking device 8 inside the housing 11. These other components of the locking device 8 are explained in more detail with reference to the following figures. The housing 11 has a cup-like configuration in this exemplary arrangement. The housing 11 may be formed of a plastics material, a fiber reinforced plastics material, metal, or aluminum. An opening 12 of the housing 11 faces the annular body 6. In this exemplary arrangement, the annular body 6 is arranged directly adjacent to the housing 11. The rotation device 7 according to FIG. 1 cannot be seen in the representation shown here, because the rotation device 7 is arranged at least partially inside the locking device 8.

Figure 3:
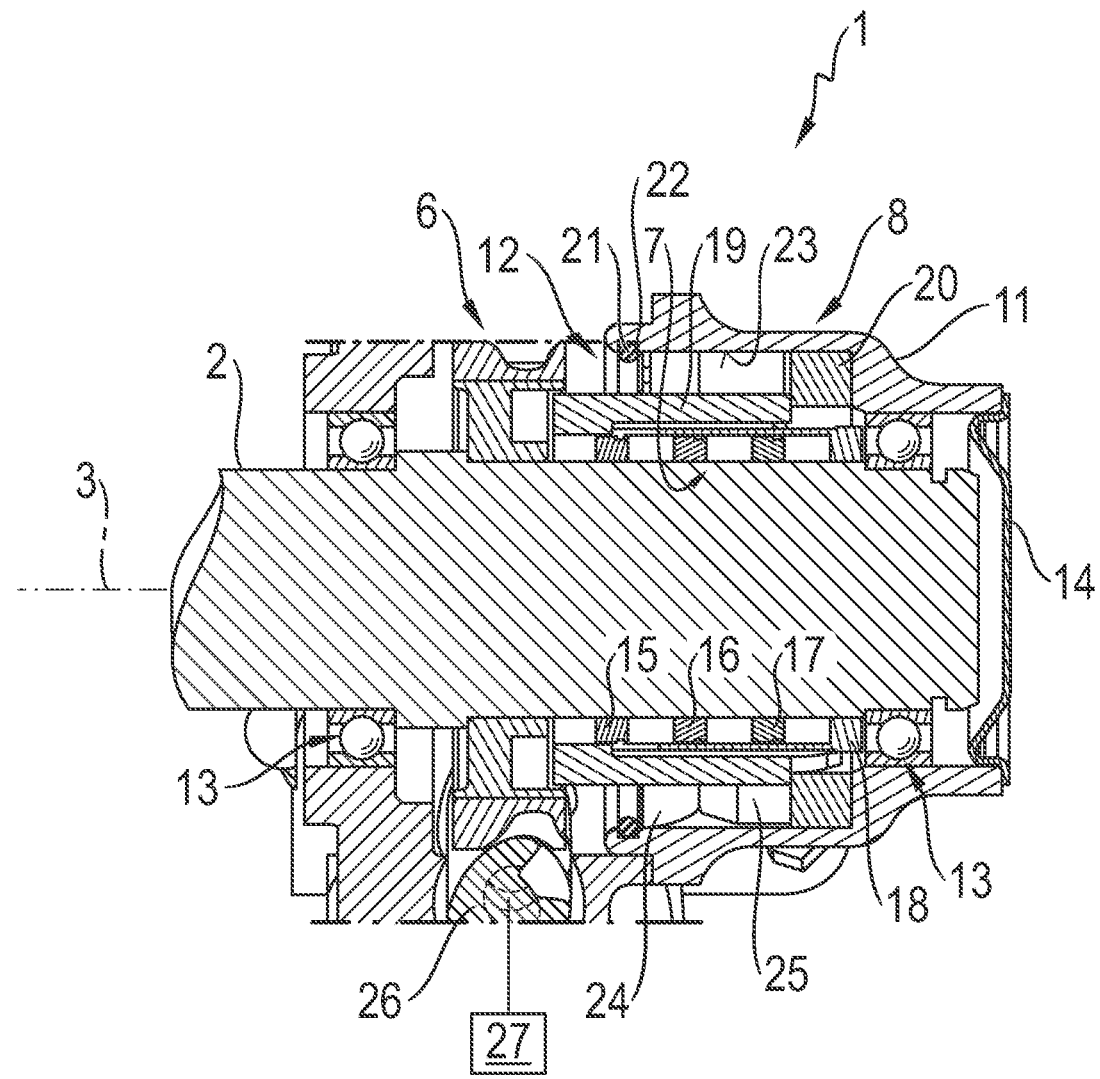
FIG. 3 is a sectional side view of the first steering device according to the disclosure according to FIG. 2.

FIG. 3 shows a sectional side view of the first steering device 1 according to the disclosure as shown in FIG. 2. The shaft 2 is rotatably mounted about the central longitudinal axis 3 by means of ball bearings 13. In this exemplary arrangement, a ball bearing 13 is arranged within the housing 11. A bottom of the housing 11 facing away from the opening 12 of the housing is formed by a cap 14 in this exemplary arrangement. In this exemplary arrangement, the ball bearing 13 arranged in the housing 11 is positioned adjacent to the cap 14.

It is easy to see that the rotation device 7 is arranged inside the locking device 8 in the assembled state shown here. In this exemplary arrangement, the rotation device 7 has a plurality of rotary elements 15, 16, 17. Furthermore, the rotation device 7 has a driver element 18. The driver element 18 is in operative connection with a locking element 19 of the locking device 8. The locking element 19 is configured like a sleeve and surrounds the rotation device 7. Furthermore, the locking device 8 has a guide 20. The guide 20 is configured here as a guide element which is arranged in a rotationally fixed and positionally fixed manner within the housing 11. In this exemplary arrangement, the guide 20 is thus configured as an independent component in relation to the housing 11. Alternatively, the guide 20 can be formed as an integral part or as a one-piece portion of the housing 11. The guide 20 also surrounds the rotation device 7 in the manner of a ring and cooperates with the locking element 19.

Furthermore, in this exemplary arrangement, the locking device 8 has a securing element 21. In this exemplary arrangement, the securing element 21 is configured as a securing ring which is arranged in a groove 22 of the housing 11. The securing element 21 and the groove 22 are arranged or formed in the region of the opening 12 and on an inner peripheral surface 23 of the housing 11.

The locking device 8 has a restoring element 24 in this exemplary arrangement. The restoring element 24 is configured as a spring, in this case, for example, as a wave ring spring. Furthermore, the restoring element 24 is annular in this exemplary arrangement and is arranged between the securing element 21 and elevations 25 of the locking element 19 that project radially outwardly with respect to the central longitudinal axis 3. Only a single elevation 25 can be seen in this representation. A spring action of the return element 24 is oriented parallel to the longitudinal direction of the central longitudinal axis 3. In addition, in this exemplary arrangement, the return element 24 based on its design forms a guide slot for guiding the locking element 19 without play. Here, the guide slot or the design of the restoring element 24 and the guide 20 are configured or aligned to correspond to one an other.

The annular body 6 configured as a gear wheel in this exemplary arrangement cooperates here by operation of a worm shaft 26 with a feedback motor 27, which is indicated here only schematically.

Figure 4:
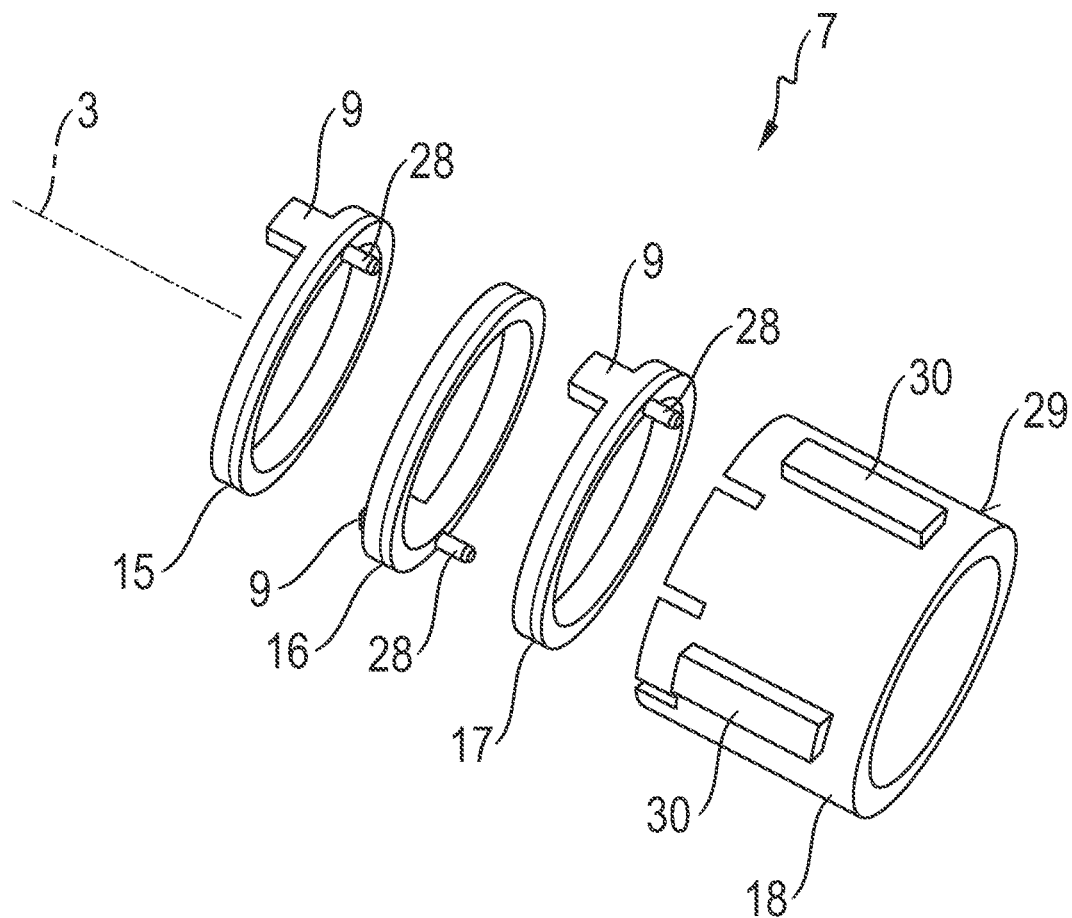
FIG. 4 is a perspective exploded view of a first rotation device for the first steering device according to the disclosure according to FIG. 1 to 3.

FIG. 4 shows a perspective exploded view of the rotation device 7 for the first steering device 1 according to the disclosure according to FIG. 1 to 3. In this exemplary arrangement, the rotation device 7 has three rotary elements 15, 16, 17 and a driver element 18. The rotary elements 15, 16, 17 have an annular design in this exemplary arrangement. The rotary elements 15, 16, 17 each have a driving lug 9. The driving lugs 9 extend in the axial direction with respect to the central longitudinal axis 3 and in a direction oriented away from the driver element 18. Central longitudinal axes of the rotary elements 15, 16, 17 and of the driver element 18 coincide with the central longitudinal axis 3, in particular in an assembled state. The rotary elements 15, 16, 17 each have a driving projection 28. The driving projections 28 are arranged on a side facing away from the driving lugs 9 of the particular rotary element 15, 16, 17. Here, the driving projections 28 extend parallel to the central longitudinal axis 3. Furthermore, the driving projections 28 are oriented in the direction of the driver element 18.

In this exemplary arrangement, the driver element 18 is configured like a sleeve. The driver element 18 has a plurality of first positive-locking elements 30 on an outer peripheral surface 29. The first positive-locking elements 30 are configured in this exemplary arrangement as web-like or rib-like projections that protrude radially with respect to the central longitudinal axis 3 from the outer peripheral surface 29. The web-like or rib-like first positive-locking elements 30 also extend parallel to central longitudinal axis 3. As will be explained in more detail below, the first positive-locking elements 30 allow the realization of a positive-locking connection between the driver element 18 and the locking element 19 of the locking device 8 according to FIG. 3.

Figure 5:
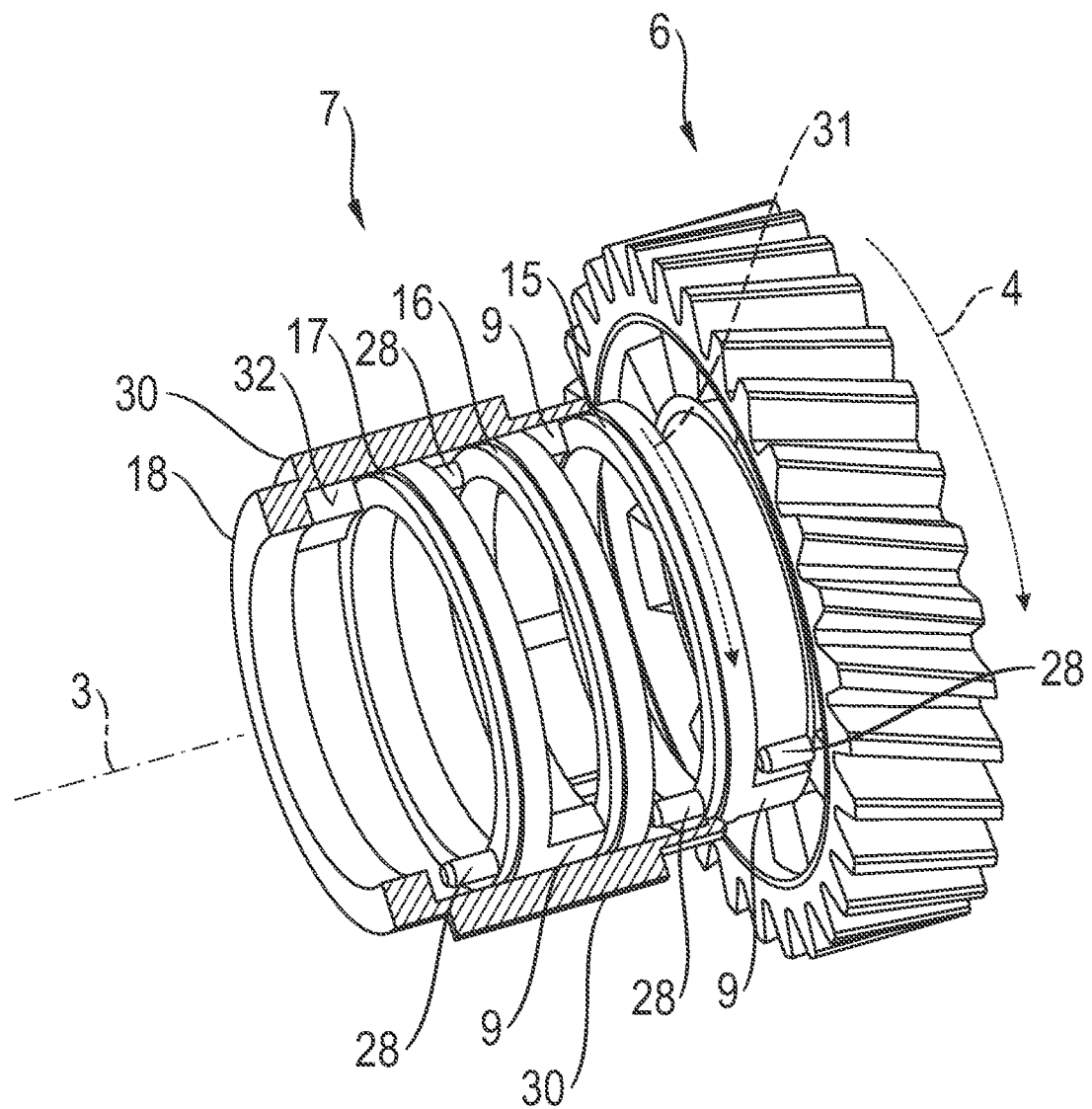
FIG. 5 is a partially sectioned, perspective side view of the first rotation device in an assembled state without a shaft.

FIG. 5 shows a partially sectioned, perspective side view of the rotation device 7 in an assembled state without the shaft 2. The annular body 6 is also shown. In this exemplary arrangement, the annular body 6 also has a driving projection 28. The driving projection 28 of the annular body 6 is oriented in the direction of the first rotary element 15. The rotary elements 15, 16, 17 are arranged inside the driver element 18 or guided inside the driver element 18. Here, the rotary elements 15, 16, 17 are arranged in a row in the axial direction of the central longitudinal axis 3.

When the rotating body 6 rotates about the central longitudinal axis 3, for example in the first direction of rotation according to arrow 4, the driving projection 28 abuts the driving lug 9 of the first rotary element 15. As a result, with a continued rotation in the first direction of rotation according to arrow 4, the first rotary element 15 is then also entrained according to arrow 31. After the entrained rotary element 15 has rotated a certain angle about the central longitudinal axis 3, its driving projection 28 in turn abuts the driving lug 9 of the second rotary element 16. As a result, with a continued rotational movement in the same direction of rotation, the second rotary element 16 is then also entrained. Finally, the driving projection 28 of the second rotary element 16 abuts the driving lug 9 of the third rotary element 17. As a result, the third rotary element 17 is also entrained with a continued rotational movement. The driving projection 28 of the third rotary element 17 ultimately abuts an entrainment surface 32 of the driver element 18. As a result, with a continued rotational movement in the same direction of rotation, the driver element 18 is also entrained and, in this example, rotates about the central longitudinal axis 3 in the first direction of rotation according to arrow 4.

Figure 6:
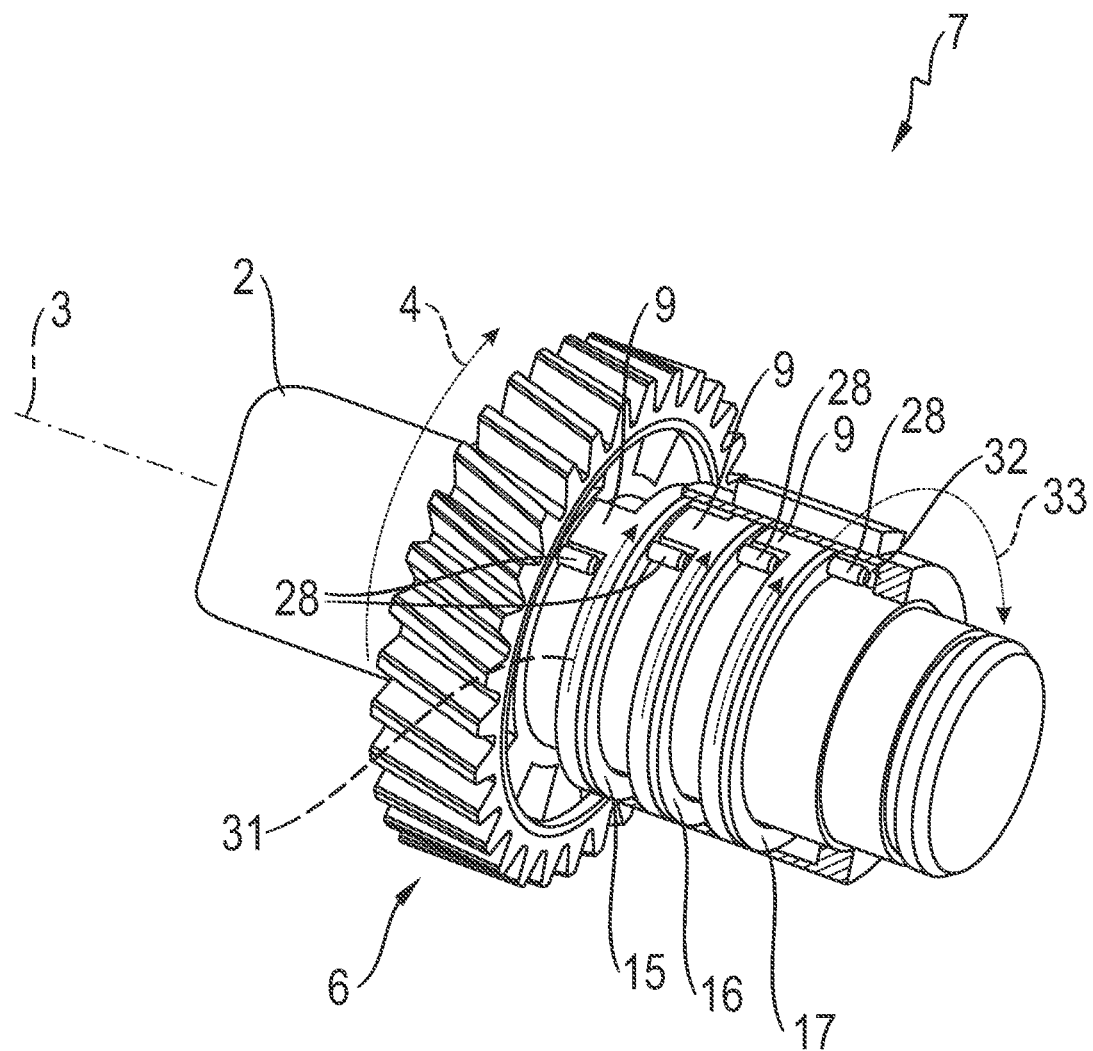
FIG. 6 is a further partially sectioned, perspective side view of the first rotation device in an assembled state with the shaft.

FIG. 6 shows another partially sectioned, perspective side view of the rotation device 7 in an assembled state with the shaft 2. Here, the closed state of the rotation device 7 previously described for FIG. 5, in which all driver projections 28 bear against the driving lug 9 of the particular adjacent rotary element 15, 16 or 17, is now shown, and the driving projection of the third rotary element 17 bears against the entrainment surface 32 of the driver element 18, whereby the driver element 18 is entrained according to arrow 33 likewise in the direction of rotation about the central longitudinal axis 3.

Figure 7:
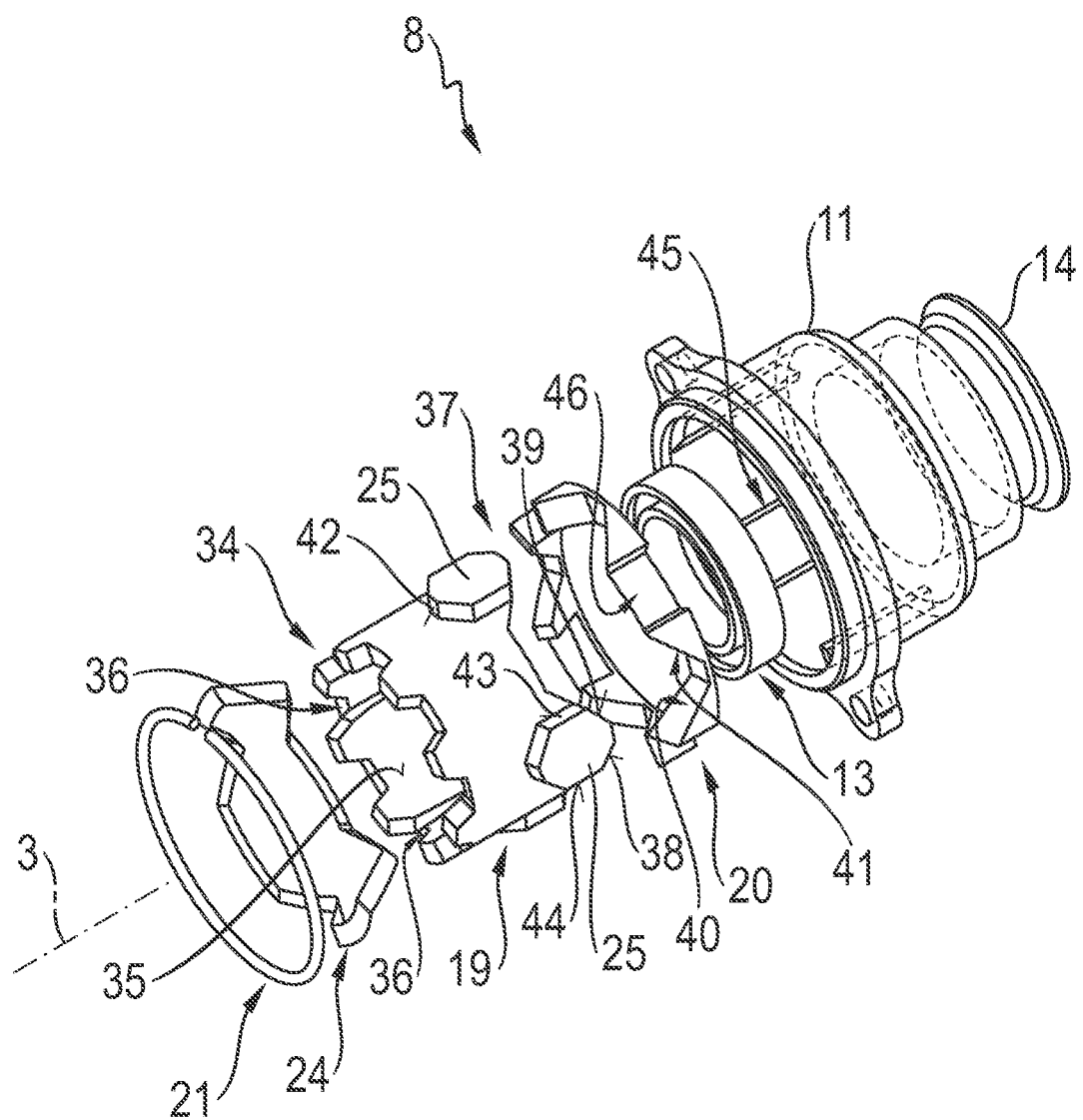
FIG. 7 is a perspective, partially transparent exploded view of a first locking device for the first steering device according to the disclosure according to FIG. 1 to 3.

FIG. 7 shows a perspective, partially transparent exploded view of the locking device 8 for the first steering device 1 according to the disclosure according to the exemplary arrangement shown in FIGS. 1 to 3. As can be seen here, the securing element 21 is configured as an open securing ring. In this exemplary arrangement, the restoring element 24 is implemented as a wave spring ring. Here, the restoring element 24 is made of a metal.

In this exemplary arrangement, the locking element 19 is formed from a plastics material. Alternatively, the locking element 19 can be made of a fiber-reinforced plastics material or a metal, for example aluminum. The locking element 19 is configured like a sleeve. The locking element 19 has an engagement contour 34 on an end face which, in the assembled state according to FIG. 3, faces the annular body 6. In this exemplary arrangement, the engagement contour 34 is configured as a first claw coupling portion. The engagement contour 34 is configured for positive-locking cooperation with a receiving contour of the annular body 6 (not shown in detail here) that is configured to correspond to the engagement contour 34. However, this positive lock only occurs in a stop position of the locking element 19. This is described in more detail with reference to the following figures.

The sleeve-like locking element 19 has on its inner peripheral surface 35 a plurality of second positive-locking elements 36. In this exemplary arrangement, the second positive-locking elements 36 are in the form of channels or grooves. Here, these channels or grooves extend parallel to the central longitudinal axis 3. In addition, the second positive-locking elements 36 are configured to correspond to the first positive-locking elements 30 of the driver element 18 according to FIG. 4. Thus, in an assembled state according to FIG. 3, a positive lock between the driver element 18 and the locking element 19 is realized.

The locking element 19 has a locking and guiding portion 37. The locking and guiding portion 37 is formed on an end face of the locking element 19 which faces the guide 20. The engagement contour 34 and the locking and guiding portion 37 are thus formed on two end faces of the locking element 19 which face away from one another. The locking and guiding portion 37 has a plurality of elevations 25. In this exemplary arrangement, a total of four elevations 25 are arranged uniformly on the outer circumference of the locking element 19. Here, the elevations 25 project radially outwardly with respect to the central longitudinal axis 3. The elevations 25 each have two ramp surfaces 38, 39. The ramp surfaces 38, 39 face the guide 20. Furthermore, the ramp surfaces 38, 39 are configured to cooperate with ramp portions 40, 41 of the guide 20. In this exemplary arrangement, the ramp surfaces 38, 39 are configured to be mirror-symmetrical to one another with respect to each elevation 25.

Furthermore, each elevation 25 has a contact surface 42. The contact surface 42 is configured for the restoring element 24 to bear against. The contact surface 42 and the ramp surfaces 38, 39 are formed on two sides of the particular elevation 25 that face away from one another. In the assembled state according to FIG. 3, the restoring element 24 is thus supported against the securing element 21 on the one hand and against the contact surfaces 42 on the other hand.

In this exemplary arrangement, the elevation 25 in each case has two stop surfaces 43, 44. The stop surfaces 43, 44 are aligned parallel to the central longitudinal axis 3. In addition, the two stop faces 43, 44 of the particular elevation 25 are formed on two sides of the elevation 25 that face away from one another. The abutment surfaces 43, 44 are configured to abut against a stop element 45. In this exemplary arrangement, the stop element 45 is formed as an integral part or portion of the housing 11. Here, the stop element 45 is configured as a rib-like or web-like projection on a hollow-cylindrical inner peripheral surface of the housing 11. The web-like or rib-like stop elements 45 extend parallel to the central longitudinal axis 3. Furthermore, the stop elements 45 extend radially inward with respect to the central longitudinal axis 3. In this exemplary arrangement, there is a plurality of stop elements 45, in this case a total of four.

In this exemplary arrangement, the stop elements 45 serve not only to provide a stop for the stop surfaces 43, 44 of the locking element 19, but at the same time also to arrange or fix the guide 20 in a rotationally fixed manner in the housing 11. For this purpose, the guide 20 has retaining grooves 46 configured to correspond in shape to the stop elements 45. Alternatively, the formation of a separate guide 20 can be dispensed with and instead the ramp portions 40, 41 can be formed as an integral part of the housing 11. As a result, the number of individual parts can be reduced.

Figure 8:
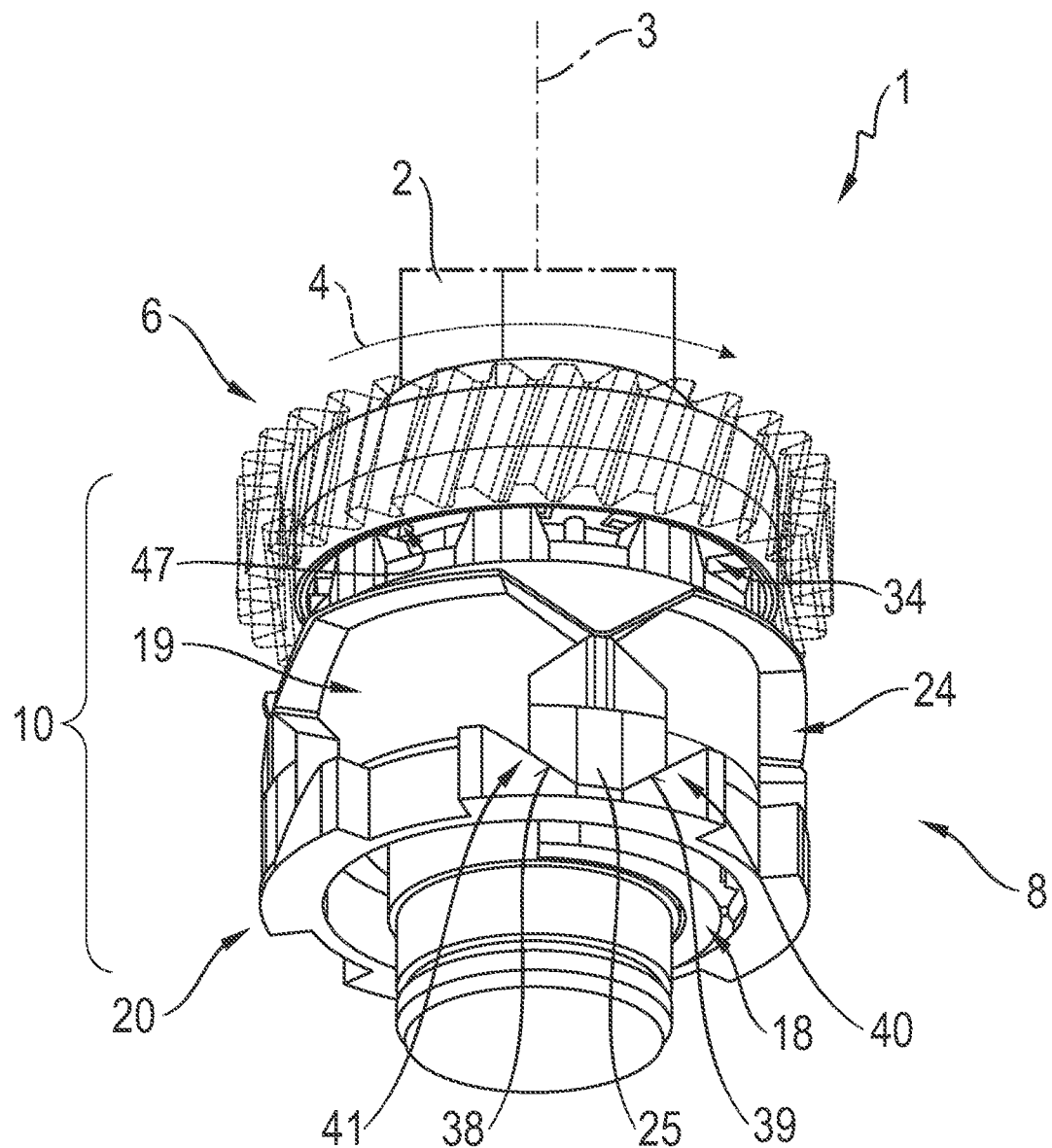
FIG. 8 is a perspective, partially transparent view of the first steering device according to the disclosure in a non-locking starting position.

FIG. 8 shows a perspective, partially transparent view of the steering device 1 according to the disclosure in a non-locking starting position. For the sake of better clarity, the securing element 21 and the housing 11, as well as the ball bearing 13, among other things, have been omitted. In this non-locking starting position, the shaft 2 can optionally rotate in the first direction of rotation according to arrow 4 or in the second direction of rotation according to arrow 5 and FIG. 1 about the central longitudinal axis 3. In the non-locking starting position of the end stop device 10 or the locking device 8, the elevations 25 of the locking element 19 are arranged centrally between two ramp portions 40, 41 of the guide element 20. The two ramp portions 40, 41 form a V-shaped contour, in the center of which in the non-locking starting position shown here the two ramp surfaces 38, 39 of the elevation 25 bear in a positive-locking manner.

In the non-locking starting position shown here, the annular engagement contour 34 of the locking element 19 is disengaged from a receiving contour 47 of the annular body 6. The receiving contour 47 of the annular body 6 is annular in shape and configured to correspond in shape to the engagement contour 34 and faces it.

For the further description of the mode of operation, it is now assumed that the shaft 2 and with it also the annular body 6, for example, is rotated in the first direction of rotation according to arrow 4 about the central longitudinal axis 3. Here, according to the previously given description of the annular body 6 in reference to FIGS. 5 and 6, the rotary elements 15, 16, 17 and ultimately the driver element 18 come into contact with one another.

Figure 9:
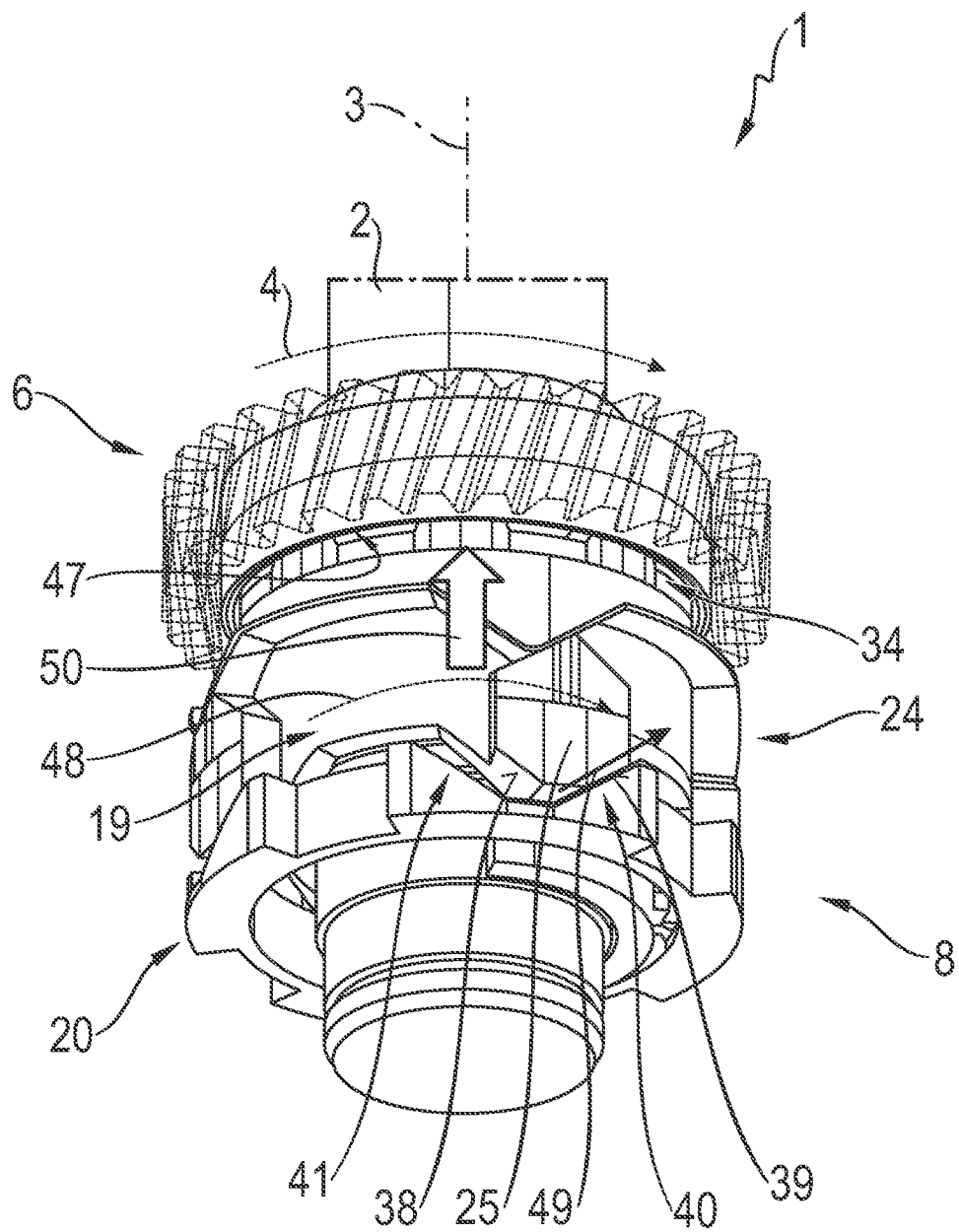
FIG. 9 is a perspective, partially transparent view of the first steering device according to the disclosure in a transitional position.

FIG. 9 shows a perspective, partially transparent view of the steering device 1 according to the disclosure in a transitional position. As soon as the third rotary element 17 in the sense of FIG. 6 abuts the driver element 18 and the rotational movement is continued in this same direction of rotation, the locking element 19 according to arrow 48 is simultaneously also entrained by the driver element 18 in the first direction of rotation according to arrow 4. Based on the contact of the ramp surface 39 of the locking element 19 with the ramp portion 40 of the guide element 20, the particular elevation 25 according to arrow 49 is guided obliquely with respect to the central longitudinal axis 3 along the ramp portion 40. As a result, the locking element 19 receives a movement component according to the arrow 50 in the axial direction of the central longitudinal axis 3. The movement component according to the arrow 50 is directed counter to the spring force of the restoring element 24. Due to the movement of the locking element 19 in the axial direction with respect to the central longitudinal axis 3 and in the direction of the annular body 6, the engagement contour 34 of the locking element 19 and the receiving contour 47 of the annular body 6 come into engagement with one another as the rotational movement continues.

Figure 10:
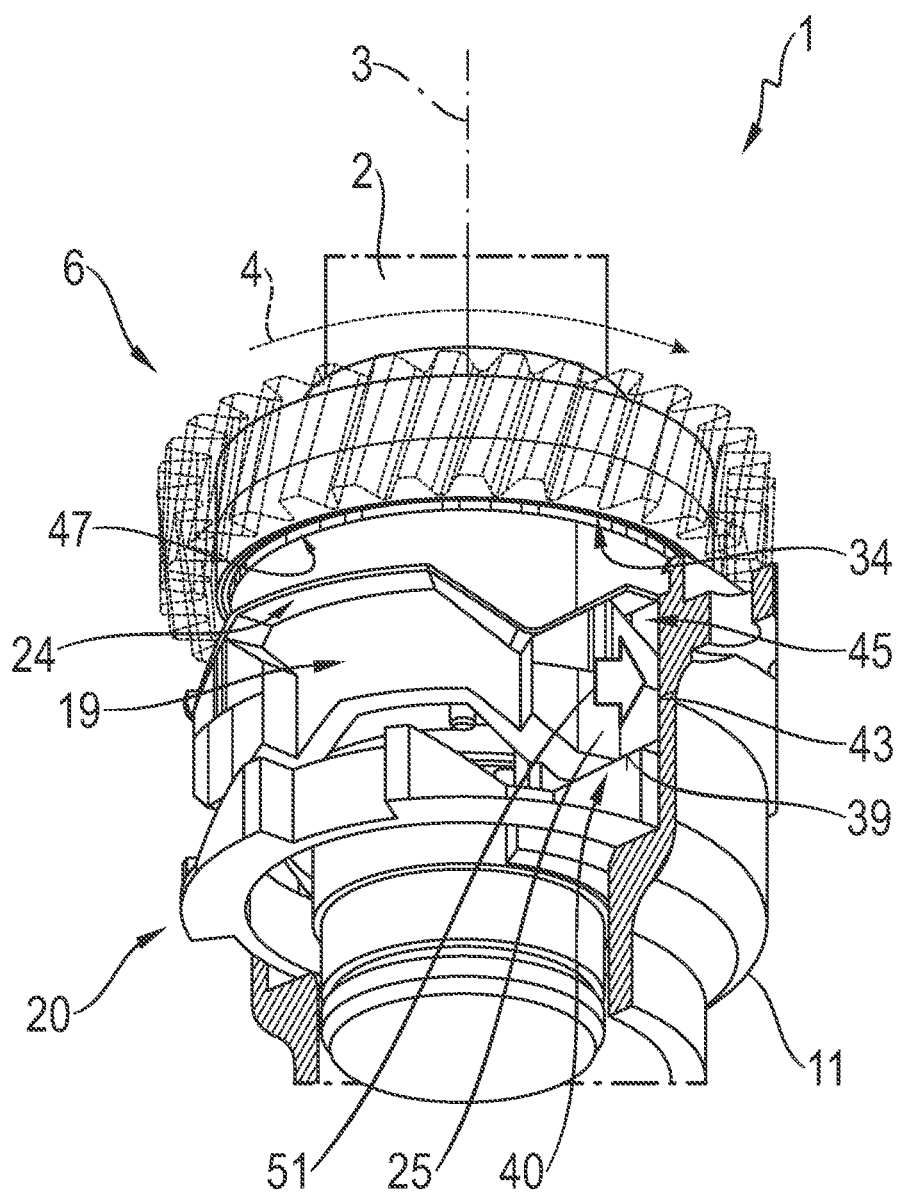
FIG. 10 is a perspective, partially transparent view of the first steering device according to the disclosure in a stop position.

FIG. 10 shows a perspective, partially transparent view of the steering device 1 according to the invention in a stop position. In the stop position, the locking element 19 is rotated in the first direction of rotation according to arrow 4 until the stop surface 43 abuts the stop element 45 of the housing 11 with a movement component according to arrow 51 in the direction of rotation about the central longitudinal axis 3. In the stop position, the engagement contour 34 and the receiving contour 47 also engage in one another in a positive-locking manner. As a result, high forces and/or torques can be transmitted and passed on in the stop position.

The operation of the steering device 1 in the second direction of rotation according to arrow 5 of FIG. 1 is analogous to the previous description, the ramp surface 38 then sliding on the ramp portion 41.

Starting from the stop position shown in FIG. 10 and after a reversal of the direction of rotation so that there is a rotation in the second direction of rotation according to arrow 5 of FIG. 1, the locking element 19 is returned back into the starting position according to FIG. 8. Here, the restoring element 24 ensures a reliable release of the positive lock between the engagement contour 34 and the receiving contour 47.

Figure 11:
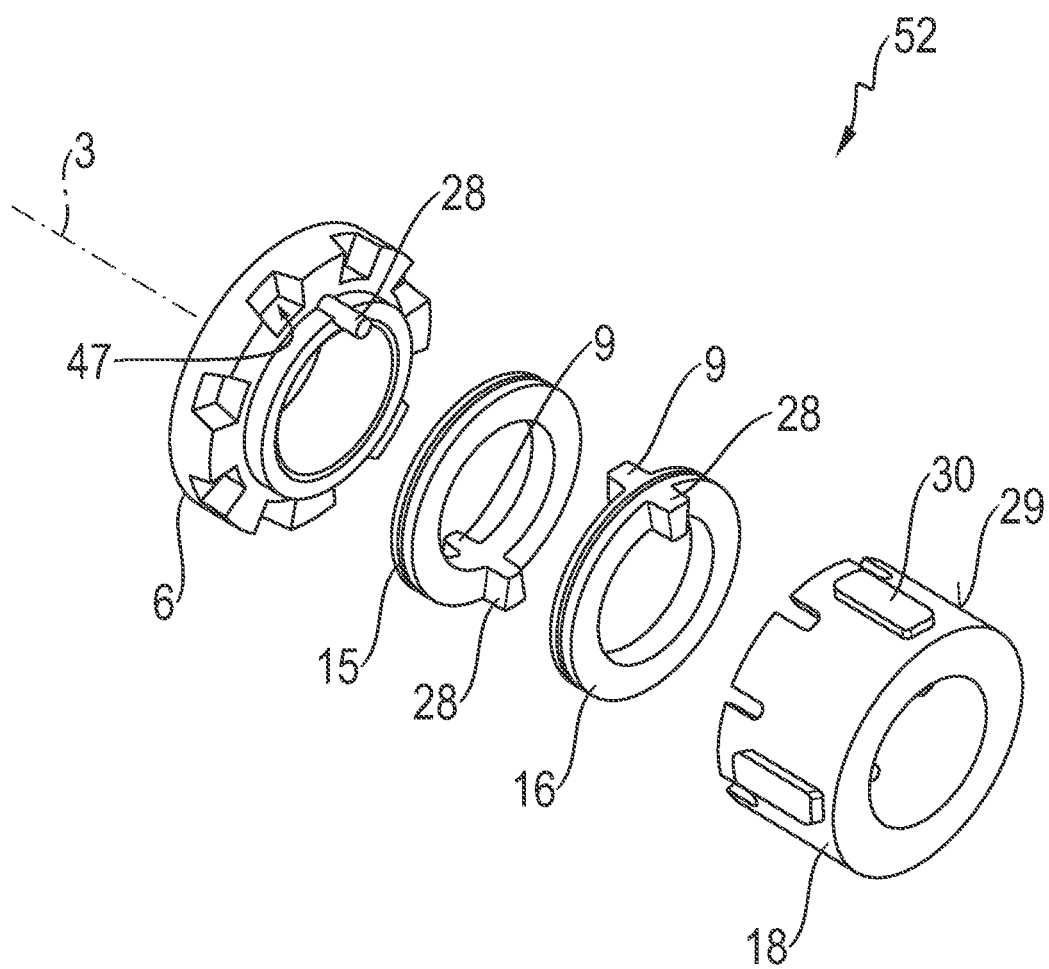
FIG. 11 is a perspective exploded view of a further rotation device for a further steering device according to the disclosure.

FIG. 11 shows a perspective exploded view of a further rotation device 52 for a further steering device according to the disclosure. The rotation device 52 has an annular body 6, a first rotary element 15 and a second rotary element 16, as well as a driver element 18. The same features have the same reference signs. In this respect, reference is also made to the preceding description in order to avoid repetition.

In this exemplary arrangement, the annular body 6 is not configured as a gear wheel. Instead, the annular body 6 is realized as a ring with a receiving contour 47. The receiving contour 47 is configured here as an annular caw coupling portion. The annular body 6 is intended to be fixed in a rotationally fixed or positionally fixed manner on the shaft 2 (not shown in detail here). The annular body 6 has a driving projection 28 which cooperates with the annular rotary elements 15, 16 and ultimately with the driver element 18 in a manner similar to that described for FIGS. 5 and 6.

Figure 12:
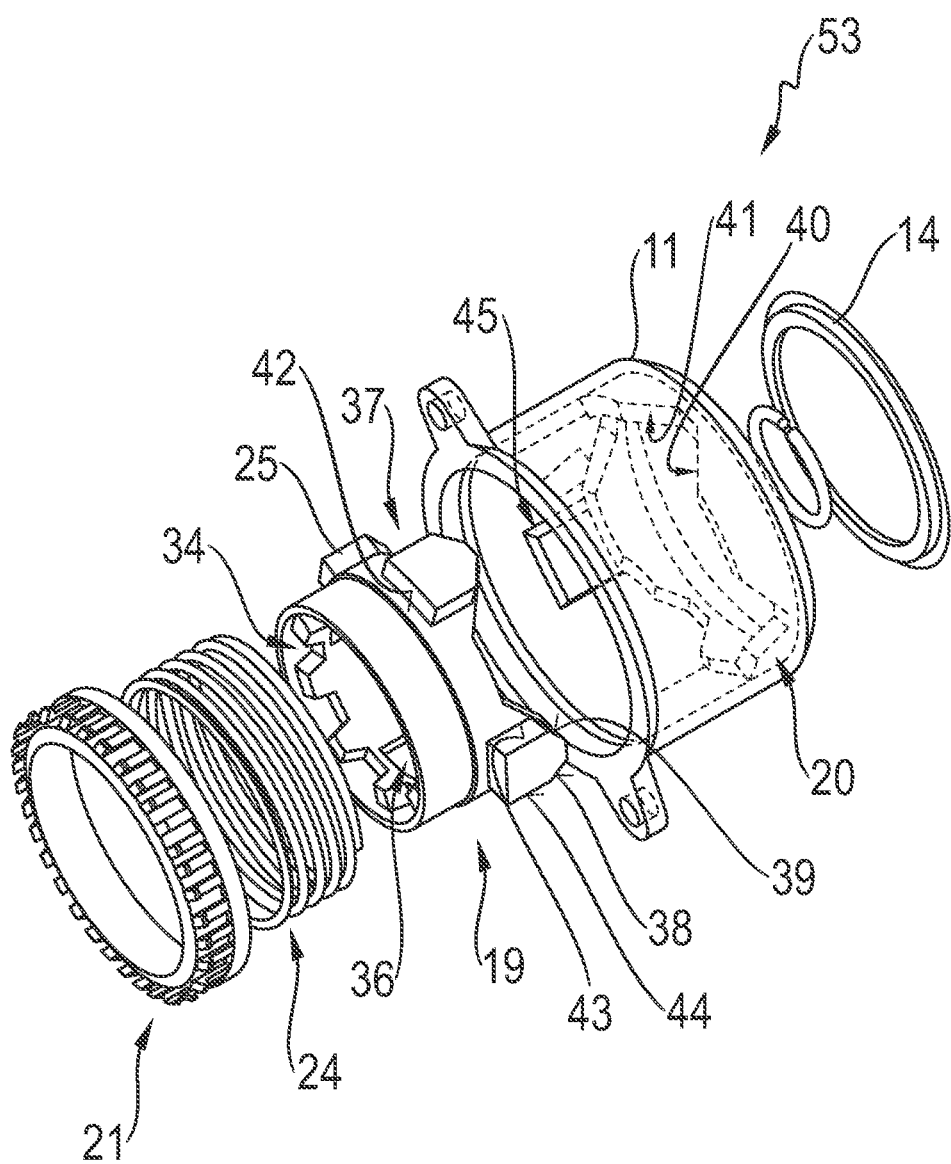
FIG. 12 is a perspective, partially transparent exploded view of a further locking device for the further steering device according to the disclosure.

FIG. 12 shows a perspective, partially transparent exploded view of a further locking device 53 for the further steering device according to the disclosure. The same features have the same reference signs. In this respect, reference is also made to the preceding description in order to avoid repetition. The locking device 53 also has a securing element 21, a restoring element 24, a locking element 19 and a guide 20. In this case, the securing element 21 in this exemplary arrangement is configured as a closed ring, which serves to support the restoring element 24, the restoring element 24 being configured as a coil spring in this exemplary arrangement. In contrast to the locking element according to FIG. 7, the engagement contour 34 of the locking element 19 is configured in this exemplary arrangement within the sleeve-like structure of the locking element 19. In addition, the basic structure and mode of operation of the locking device 53 corresponds to that of the locking device 8 according to FIG. 1 to 10. In this respect, reference is also made to the preceding description in order to avoid repetition.

Figure 13:
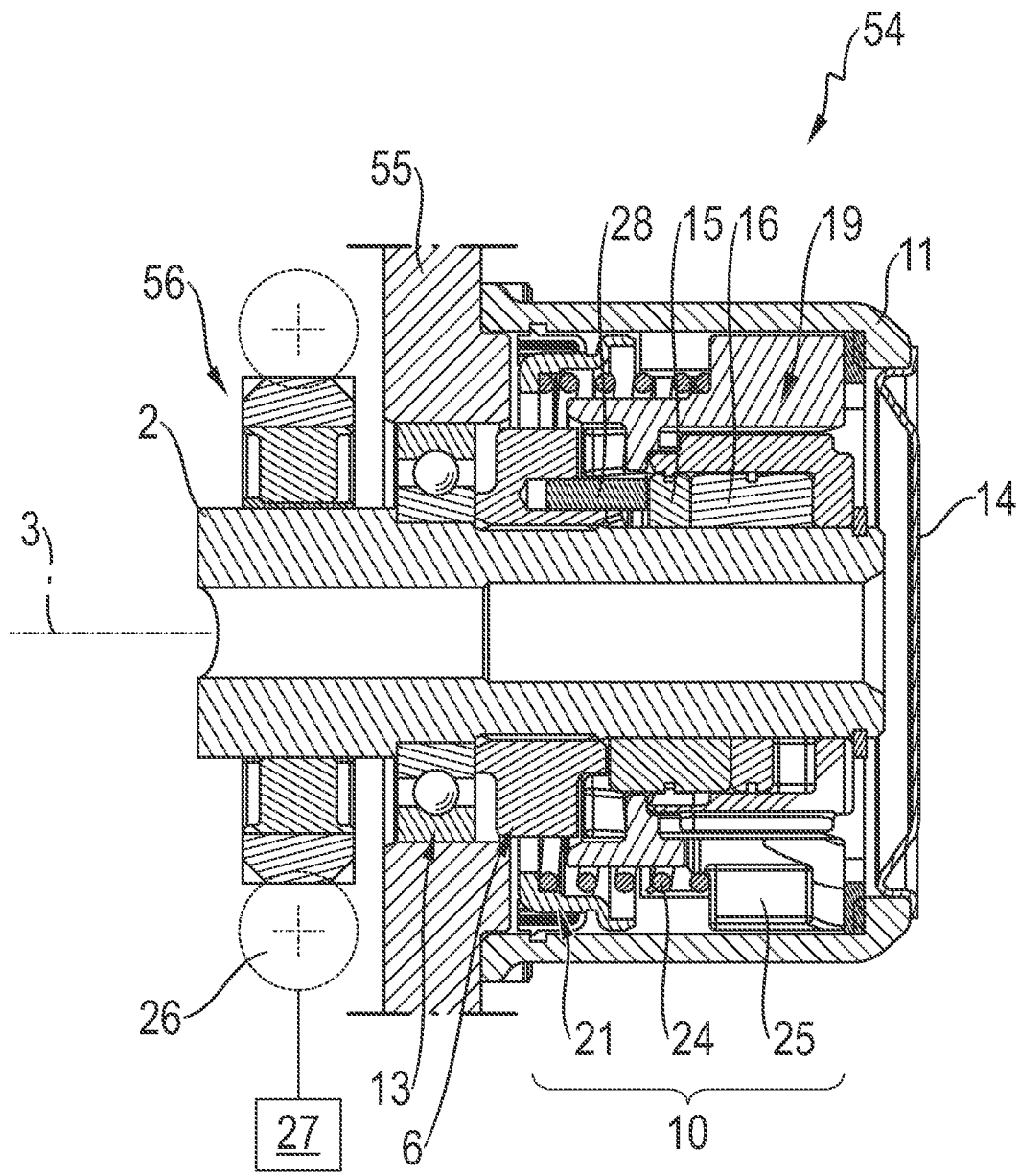
FIG. 13 is a sectional side view of the further steering device according to the disclosure.

FIG. 13 shows a sectional side view of the additional steering device 54 according to the disclosure with the rotation device 52 according to FIG. 11 and the locking device 53 according to FIG. 12. The same features have the same reference signs. In this respect, reference is also made to the preceding description in order to avoid repetition. In contrast to the steering device 1 according to FIG. 3, the end stop device 10 in the steering device 54 shown here is arranged completely outside of a gear case 55. In this case, only the shaft 2 has to extend through the gear case 55 outwardly. In contrast to the steering device 1 according to FIG. 3, a gear wheel 56 does not serve here at the same time as the annular body 6 for the end stop device 10. Instead, the annular body 6 is configured here as a component that is separate from the gear wheel 56.

The invention claimed is:

1. A steering device comprising an end stop device for limiting a steering angle of rotation, the end stop device having a rotation device, wherein the rotation device has at least one rotary element disposed within the rotation device, which is rotatable about a central longitudinal axis of a shaft and/or together with the shaft, and wherein the end stop device has a locking device which cooperates with the rotation device for stopping a rotational movement of the shaft about the central longitudinal axis and with respect to two directions of rotation oriented away from each other, wherein the locking device has a locking element, the locking element for limiting the steering angle of rotation by operation of the rotation device being movable with at least a first movement component in an axial direction of the central longitudinal axis of the shaft.

2. The steering device according to claim 1, wherein the locking element for limiting the steering angle of rotation is movable by operation of the rotation device with a further movement component in a direction of rotation about the central longitudinal axis of the shaft, the locking element for stopping the rotational movement of the shaft and in the direction of rotation abutting at least one stop element.

3. The steering device according to claim 1, wherein an engagement contour of the locking element engages with a positive fit into a correspondingly configured receiving contour due to the first movement component in the axial direction of the central longitudinal axis.

4. The steering device according to claim 1, wherein the locking element is configured as a sleeve to form an engagement contour.

5. The steering device according to claim 1, wherein the locking device has a restoring element which acts at least in the axial direction of the central longitudinal axis.

6. The steering device according to claim 1, wherein the locking device has a guide for guiding the locking element, the guide being non-rotatable and/or fixed in position.

7. The steering device according to claim 1, wherein the rotation device has a driver element which is rotatably mounted about the central longitudinal axis of the shaft, a rotational movement of the at least one rotary element being transferable to the locking element by the driver element.

8. The steering device according to claim 1, wherein the locking element is configured as a sleeve and has a locking and guiding portion.

9. The steering device according to claim 8, wherein an elevation has two ramp surfaces which are mirror-symmetrical to one another, each ramp surface being associated with a ramp portion of the guide; the elevation having a contact surface against which a restoring element bears.

10. A steer-by-wire steering system comprising a steering device according to claim 1.

11. The steering device according to claim 2, wherein the stop element is configured as a projection of a housing, radially aligned with the central longitudinal axis.

12. The steering device according to claim 3, wherein the receiving contour is formed on an annular body arranged in a rotationally fixed and/or fixed position on the shaft and around the shaft.

13. The steering device according to claim 2, wherein an engagement contour of the locking element engages with a positive fit into a correspondingly configured receiving contour due to the first movement component in the axial direction of the central longitudinal axis; wherein the receiving contour is formed on an annular body arranged in a rotationally fixed and/or fixed position on the shaft and around the shaft.

14. The steering device according to claim 1, wherein the locking element is configured as a first claw coupling portion to form an engagement contour; the first claw coupling portion facing a second claw coupling portion of an annular body configured to correspond to the first claw coupling portion in order to realize a claw coupling such that the two claw coupling portions engage in a positive-locking manner in a stop position of the locking element.

15. The steering device according to claim 5, wherein the restoring element acts counter to a movement of the locking element in the axial direction of the central longitudinal axis of the shaft.

16. The steering device according to claim 5, wherein the locking element can be returned by the restoring element from a stop position and, when the direction of rotation is reversed, into a non-locking starting position.

17. The steering device according to claim 6, wherein the guide has at least one ramp portion which has a slope extending in one of the two directions of rotation and, because of the ramp portion, the locking element at the same time is movable in an axial direction with respect to the central longitudinal axis and in a direction of rotation about the central longitudinal axis.

18. The steering device according to claim 7, wherein the rotary element has a driving lug which, after a predetermined rotational movement of the rotary element about the central longitudinal axis, abuts the driver element and entrains it in a rotational direction.

19. The steering device according to claim 18, wherein the rotation device has a plurality of rotary elements for specifying a maximum steering angle of rotation.

20. The steering device according to claim 8, wherein the locking and guiding portion has at least one elevation projecting radially outwardly and/or axially with respect to the central longitudinal axis; the elevation having at least one ramp surface for cooperation with a ramp portion of a guide and/or at least one stop surface for abutment against a stop element in a stop position of the locking element.

* * * * *